Dec. 2, 1958   L. PARKIN   2,862,267
FASTENERS
Filed Feb. 4, 1954
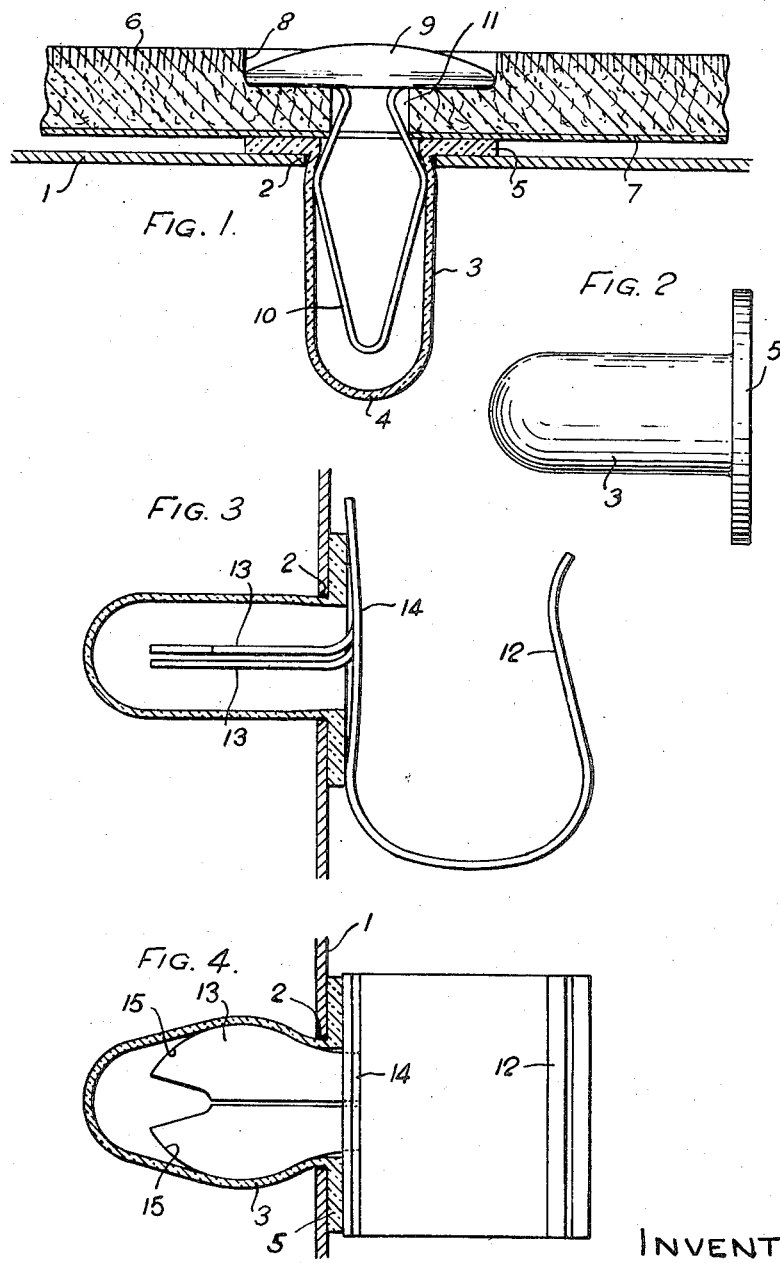
INVENTOR:
LESLIE PARKIN,
BY Philip E. Parker
ATTORNEY.

United States Patent Office 2,862,267
Patented Dec. 2, 1958

2,862,267

FASTENERS

Leslie Parkin, Hyson Green, England, assignor to United-Carr Fastener Corporation, Boston, Mass., a corporation of Delaware Application February 4, 1954, Serial No. 408,092

Claims priority, application Great Britain February 16, 1953

5 Claims. (Cl. 24—73)

This invention relates to fasteners by means of which carpets, panels or other parts are detachably connected to supports, for instance panels, having apertures for receiving yieldable fastener elements.

Hitherto, the apertures, which are usually circular, have been directly engaged by yieldable leg parts of the fasteners, and considerable disadvantage has arisen from the fact that the apertures are not completely closed or sealed off by the fasteners, particularly the leg parts thereof. Thus, it has been possible for air or moisture from outside the support to enter the apertures past the leg parts and to gain access to the inner surface of the support. This ingress of moisture frequently results in rusting or corrosion of the fasteners and also results in deleterious action on the carpets, interior panels or other parts secured in position by the fasteners. Moreover, the entry of air leads to undesirable draught as, for example, when the fasteners are used for securing carpets to apertured floor panels of motor vehicles.

With a view to eliminating the above disadvantages, an improved fastener for removably securing parts together comprises, according to this invention, one element in the form of a tubular socket closed at its inner end and provided at its open outer end with an outwardly directed projection or flange, and a socket insertion element so constructed that upon being forced into the socket element it presses against the inner surface thereof.

The invention also comprises the removable connection of two parts together by means of the fasteners, wherein one part is provided with apertures into which the tubular sockets are inserted so that the flanges thereof are seated against said part around the apertures, and wherein the other part is retained in position by the socket insertion elements when inserted in said sockets, the sockets or socket flanges being pressed into sealing relation with the apertures.

Two embodiments of fastener according to this invention and the mode of use thereof will now be described with reference to the accompanying drawings, in which:

Fig. 1 is a sectional elevation of one embodiment of fastener in assembled condition as employed by way of example for locating and holding a carpet or the like in position on a floor panel.

Fig. 2 is a side elevation of a tubular socket part of the fastener illustrated in Fig. 1.

Fig. 3 is a side sectional elevation of a fastener constructed according to the second embodiment of the invention.

Fig. 4 is a plan view, partly in section, corresponding to Fig. 3.

Referring to Figs. 1 and 2 of the drawings, a floor panel 1 is provided with a circular aperture 2 for receiving a tubular socket element 3 which is closed at its inner end 4 and is formed at its open outer end with an outwardly directed circular flange 5. The flange 5 is seated on a part of the panel 1 surrounding the aperture 2. The tubular socket which forms one part of a fastener is constructed of semi-rigid material capable of a slight yielding action and may be formed from natural or artificial rubber or from a plastic material possessing a slight degree of resilience, such as polythene. The diameter of the tubular socket 3 is such that said part has a relatively close or forced fit in the aperture 2. A floor covering 6, such as a carpet, having a backing 7 is positioned above the panel 1 and is provided with a recess 8 for accommodating the head 9 of a socket insertion element of the fastener. This element comprises a pair of integrally formed leg parts 10 connected at their upper ends to the head 9. The carpet 6 and backing 7 are formed with openings 11 through which the upper ends of the leg parts extend.

When the fastener element 9, 10 is being forced into the tubular socket 3 to occupy the position illustrated in Fig. 1, the leg parts 10 are flexed laterally inwards as they pass the aperture 2 and then expand into pressing engagement with the inner surface of the socket 3 at a position below the aperture 2. The socket 3 is held in sealing relation with the aperture 2, the sealing action being enhanced by the action of the carpet 6 in pressing the flange 5 against its seating. The part of the socket 3 enclosing the yieldable leg parts 10 of the fastener is imperforate so that when the fastener is in position as illustrated in Fig. 1 the aperture 2 is sealed against ingress of air or moisture from below the panel 1. It will of course be understood that a plurality of apertures 2 are normally provided to receive the fasteners.

The socket insertion element of the fastener may assume different forms. Figs. 3 and 4 illustrate an embodiment of socket insertion element comprising a U-shaped spring metal clip 12 from which are stamped a pair of leg parts 13 which extend perpendicularly in an outward direction from one limb 14 of the head 12. As illustrated in Fig. 4, the leg parts 13 are slightly separated from each other and have outwardly bowed lateral edges 15. The legs 13 are disposed in slightly spaced parallel planes as indicated in Fig. 3. A part of a carpet, panel or other part, not shown, is held in the clip 12 and when the fastener is in the assembled position, illustrated in Figs. 3 and 4, the tubular socket 3 is in sealing relation with the aperture 2. In this embodiment, the sealing action is enhanced by the pressure of the limb 14 of the clip 12 on the socket flange 5. When the legs 13 are forced into the socket they initially contract with a scissors-like action and then expand into firm pressing engagement with the tubular socket 3 which due to its resilience bulges outwardly behind aperture 2.

It will be appreciated from the foregoing description that the sealing of aperture 2 is achieved by the tubular socket 3. The sealing action may result from a forced fit of the socket part 3 in the aperture and/or by the pressure exerted on the outer face of flange 5 either by the carpet 6 or its equivalent, such as a panel, or by a part of the socket insertion element as in the case of limb 14 in Fig. 3.

The fasteners according to the invention may be employed for securing any two parts together, for example a pair of panels, provided one of the parts is formed with apertures for receiving the tubular sockets.

I claim:

1. A fastener for removably securing parts together comprising a socket element and a resilient stud element, said stud and socket elements being separable, said socket element comprising a tubular portion closed at one end and having an outwardly directed flange at the other end, said tubular portion having an outside diameter suitable for insertion into the aperture of at least one of the parts to be secured together, said resilient stud element comprising a head portion adopted for engagement with another of the parts to be secured together and a stud portion insertable within said socket element and including resilient portions normally extending beyond the region defined by an imaginary tube concentric with the stud portion and of a diameter equal to the aforesaid outside diameter of said tubular portion, whereby upon application of the socket element into the substantially aligned apertures of one or more of the parts to be secured together and the insertion of the resilient stud into the socket element, the flange of the socket element may be caused to engage one face of the parts to be secured together while the stud will cause portions of the tubular portion of the socket element to be expanded to engage the edges of an aperture adjacent an opposite face.

2. A fastener device comprising a resilient stud element and a socket element, said stud and socket elements being separable, said socket element comprising a tubular portion closed at one end and having an outwardly directed annular flange at the other end, said tubular portion haivng an outside transverse dimension less than that of the aperture in the structure with which the fastener device is to be used, said resilient stud element comprising a head portion and a stud portion extending therefrom adapted for insertion into said socket element and including resilient portions normally extending beyond the region defined by an imaginary tube concentric with the stud portion and of an outside transverse dimension substantially equal to the aforesaid outside transverse dimension of said tubular portion, whereby upon application of the socket element into an aperture of a structure with which it is to be used and the insertion of the resilient stud element into the socket element, the flange of the sealing member will be caused to engage one face of a structure with which the fastening device is to be used and the tubular portion will be caused to be expanded to engage the edges of an aperture adjacent an opposite face.

3. A fastener device in accordance with claim 2 wherein the socket element is formed from semi-rigid material capable of slight yielding action when the stud portion is inserted in the socket element.

4. A fastener device in accordance with claim 3 wherein the socket element is made of a plastic material possessing a slight degree of resilience.

5. A fastener installation comprising a fastened structure, a resilient stud element and a socket element, said stud and socket elements being separable, said fastened structure including faces on opposite sides and aperture extending between said faces, said socket element comprising a tubular portion extending through said aperture with an outwardly directed annular flange at one end engaging one face of said fastened structure and with the other end closed and extending beyond the other face of said fastened structure, said resilient stud element comprising a head portion bearing upon said one face and a stud portion extending into said socket element and including resilient portions deforming said tubular portion beyond the other face of said fastened structure to cause portions of said tubular portion to engage the edges of the aperture adjacent said other face whereby said fastening device is secured to said fastened structure.

References Cited in the file of this patent

UNITED STATES PATENTS

| Re. 18,589 | Walters | Sept. 6, 1932 |
| 12,540 | Chapman | Mar. 20, 1855 |
| 1,204,227 | Young | Nov. 7, 1916 |
| 1,690,853 | Behrman | Nov. 6, 1928 |
| 2,051,407 | Jones | Aug. 18, 1936 |
| 2,062,057 | Hobby | Nov. 24, 1936 |
| 2,139,244 | Nauert | Dec. 6, 1938 |
| 2,271,495 | Hall | Jan. 27, 1942 |
| 2,275,553 | Place | Mar. 10, 1942 |
| 2,397,801 | Mitchell | Apr. 2, 1946 |
| 2,627,099 | Becker | Feb. 3, 1953 |

FOREIGN PATENTS

| 443,282 | Germany | Apr. 25, 1927 |